United States Patent [19]

Schuler

[11] 4,395,269

[45] Jul. 26, 1983

[54] COMPACT DUST FILTER ASSEMBLY

[75] Inventor: Frederick E. Schuler, St. Paul, Minn.

[73] Assignee: Donaldson Company, Inc., Minneapolis, Minn.

[21] Appl. No.: 307,166

[22] Filed: Sep. 30, 1981

[51] Int. Cl.³ .................. B01D 46/04; B01D 46/48; B01D 50/00

[52] U.S. Cl. .................. 55/302; 55/319; 55/324; 55/325; 55/332; 55/430; 55/484; 55/498; 55/508

[58] Field of Search .............. 55/284, 302, 319, 324, 55/332, 350, 430, 484, 498, 508, 521, 325

[56] References Cited

U.S. PATENT DOCUMENTS

| | | | |
|---|---|---|---|
| 3,173,777 | 3/1965 | Tamny | 55/484X |
| 3,726,066 | 4/1973 | Colley et al. | 55/302 |
| 4,171,963 | 10/1979 | Schuler | 55/302 |
| 4,218,227 | 8/1980 | Frey | 55/302 |
| 4,227,903 | 10/1980 | Gustavsson et al. | 55/302 |
| 4,277,260 | 7/1981 | Browning | 55/302 X |
| 4,278,454 | 7/1981 | Nemesi | 55/302 |

FOREIGN PATENT DOCUMENTS 2401690 3/1979 France .

627841 10/1978 U.S.S.R. ................. 55/302

Primary Examiner—Kathleen J. Prunner
Attorney, Agent, or Firm—Merchant, Gould, Smith, Edell, Welter & Schmidt

[57] ABSTRACT

An air filter assembly (10) is disclosed which includes a dirty air chamber (22) having an air inlet (20) and a plurality of clean air outlets (34). In fluid communication with each air outlet (34) in the dirty air chamber (22) is a pleated media filter element (32) positioned so as to be suspended in a cantilever manner at an acute angle with respect to a horizontal plane. A distribution space (33) for reducing entering air velocities is created by the inclined uppermost filter elements (32) and the horizontal plane of the top surface panel (16). The lowermost portion (25) of the dirty air chamber (22) provides a collection area for particulate matter removed from the filter elements. The lowermost portion (25) includes a sloping surface (24) constructed of a material which flexes in response to pressure increases within the chamber (22). The pressure increases are generally caused by pulse-jet cleaning means (65, 66) located in a clean air chamber (60) external to but adjacent the air outlets (34) of the dirty air chamber (22).

14 Claims, 4 Drawing Figures

COMPACT DUST FILTER ASSEMBLY

TECHNICAL FIELD

The present invention relates to air filtering systems and more particularly to compact systems having considerable cleaning capacity as expressed in cubic feet per minute of air flow per unit of working volume.

BACKGROUND OF THE INVENTION

In most industries, systems are mandatory for cleaning air and related gases laden with dust or other particulate matter generated by the industrial processes and the combustion of solid fuel. Prior art devices for meeting the filtering needs of such industries have included what are termed "baghouses" or "filterhouses". However, such prior art devices have significant drawbacks in that the filter bags and supporting frames are bulky, difficult to install and replace, and subject to damage and rapid wear. The housing for such filter elements occupies considerable space which often could be put to more valuable use. To improve upon such prior art devices, efforts have been directed to reducing the size of the air filters used. Pleated paper filter elements such as taught in U.S. Pat. No. 4,218,227 to Frey for a "Dust Collector" have brought the art closer to achieving reduced space requirements while maintaining effective filtering capacities. However, the industry need for a more compact filter assembly with even greater filtering capacity remains.

For example, the large prior art devices have physical volume requirements for their air cleaning and hopper space of about one-twentieth of the volume of fluid cleaned per minute. Stated differently, such devices have a cleaning capacity of twenty, or even much less, cfm per cubic foot. When an industry requires one hundred thousand to one million cubic feet of fluid to be cleaned each minute, the larger prior art devices become gigantic structures whose volume requirements may even surpass the volume of the dust-generating facility. Further, the cost of purchase, installation, and connection of such devices may be prohibitive in view of present day environmental regulations. It is not unusual for a company to shut down its operation in order to avoid the prohibitive costs for installing such prior art devices.

What is needed then in such industries is an apparatus and method for obtaining a much greater cleaning capacity, along with a reduction in the housing volume required for the filter assembly, than has to date been possible with the prior art devices. The present invention achieves this objective and includes features which combine to provide an air filtering assembly having a cleaning capacity of at least forty to fifty or more cfm per cubic foot of volume, with a remarkably compact and serviceable design and arrangement.

SUMMARY OF THE INVENTION

The present invention provides an air filter assembly having a dirty air chamber of substantially rectangular construction with a plurality of clean air outlets and a dirty air inlet being positioned in a portion of the dirty air chamber above the air outlets, e. g. the chamber's uppermost wall. A number of spaced apart, pleated media filter elements are mounted within the chamber for filtering the entering dirty air. Pulse-jet cleaning means are provided in the assembly for periodically removing particulate matter which accumulates upon the filter elements. The filter elements are positioned in a generally downwardly, inclined direction with respect to the horizontal plane of the chamber's upper panel wall surface. This arrangement provides a triangular distribution space which affects the velocity of the entering air. A lowermost portion of the assembly is arranged and constructed to collect the removed particulate matter. The collection portion includes a sloping surface constructed of a material which flexes in response to the pressure differentials created within the chamber during the operation of the pulse-jet cleaning means.

In this manner, dirty air entering the filtering chamber is first received into the distribution space defined by the generally horizontal upper panel surface wall and the uppermost mounted filter elements which extend downwardly in an inclined position with respect to the upper panel. As the entering air moves into the distribution space, its velocity is significantly reduced thereby allowing a more effective distribution of the air to the pleated media elements.

As particulate matter collects upon the stepped, cantilevered arrangement of filter elements, the pulse-jet cleaning means is operated to clean each element in turn from the uppermost to the lowermost element. Particulate matter blown off each element is carried downward by gravitational forces and fluid dynamic transport. Additionally, the sloping surface of the collection portion of the assembly moves outward, or flexes, as the pressure increases within the chamber with each operation of the pulse-jet means. The flexing movement allows the air entraining the dust from the filter element to travel towards the collection area, thereby helping to prevent the removed dust from being re-deposited on a neighboring filter element. Also, the flexing surface dampens the noise and vibrations of the pulse jet cleaning means, and moves the dust collected on its surface towards the collection area for subsequent removal from the assembly itself.

Preferably, baffle devices are mounted in a location between the uppermost filter elements and the air inlet to shield the uppermost filter elements from direct impingement by the particulate laden air entering the dirty air chamber. Additionally, a pre-separator may be used. This could include a pair of louvered panels positioned between vertical rows of filter media elements.

BRIEF DESCRIPTION OF THE DRAWINGS

FIG. 3 is a front elevation view of the present invention with portions broken away;

FIG. 4 is a perspective view of a portion of the present invention.

DESCRIPTION OF THE PREFERRED EMBODIMENT

Figure 1:
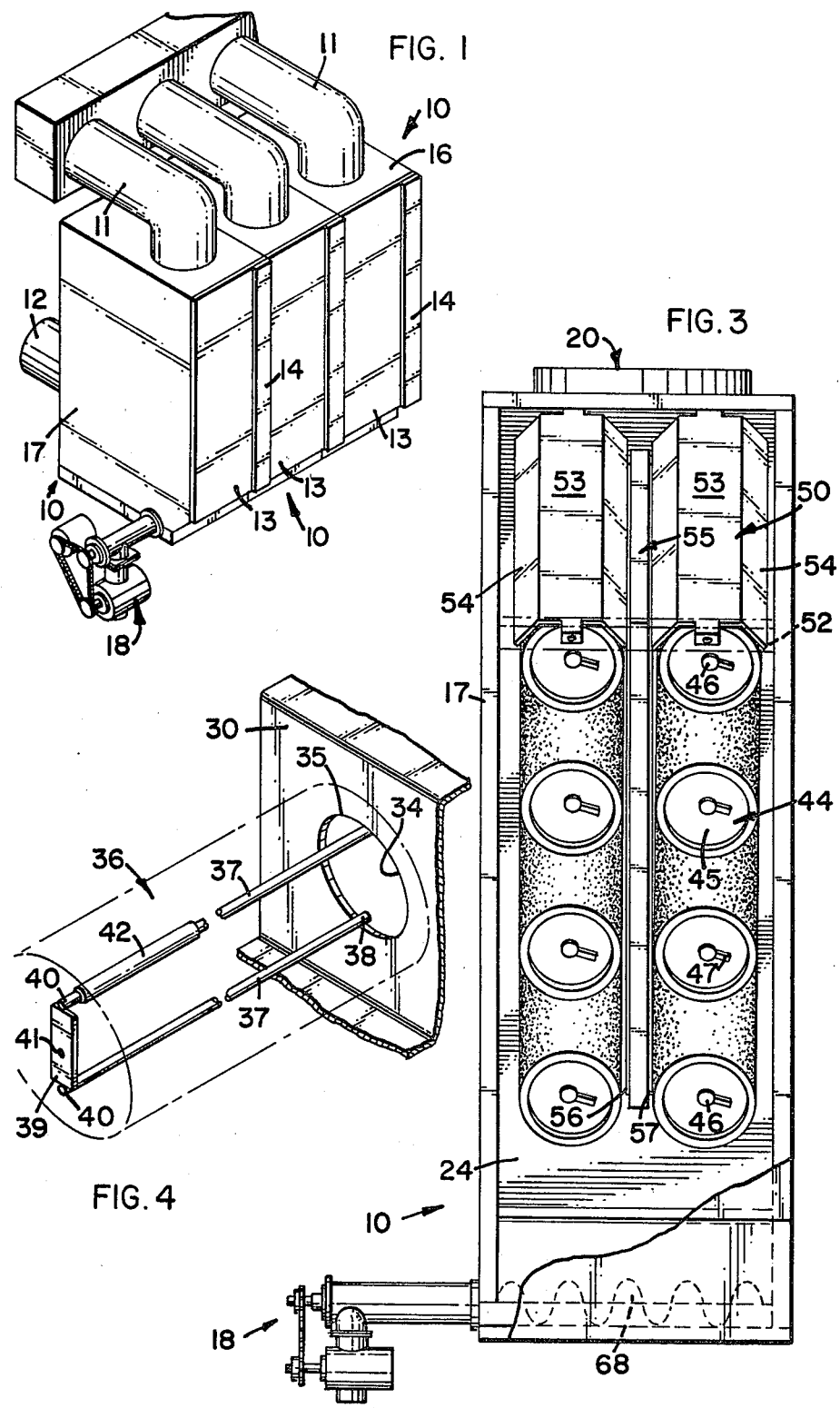
FIG. 1 is a perspective view of one type of operational installation for the present invention.

Referring now to the drawings, the present invention is shown in FIG. 1 as it might appear in an industrial plant setting. Three units of the present invention are shown in side-by-side arrangement and are indicated generally by the numeral 10, but it should be understood that a typical installation could include as many as twelve or more units or modules. The arrangement shown in FIG. 1 fits into a space six feet deep by ten feet high by ten feet wide, or 600 cubic feet. These sizes, however, are examples and are not to be construed as any definite size proportions for the invention. The particular industrial setting will dictate the ultimate number of the units or modules used.

Each module 10 shown in FIG. 1 includes a conduit 11 for venting dirty or contaminated air into the filter assembly. A like conduit 12, shown only partially in the drawing, extends from a back or rearward portion of each module 10 for venting the clean or filtered air from the filter assembly. Access to the interior of each module 10 is provided by a main, front access door 13 hinged at one side. The latches for the door are completely hidden behind a narrow, full length secondary door 14. The secondary door 14 is mounted on the front door 13 by gooseneck hidden hinges (not shown) with a concealed latch or lock (also not shown) being provided. This door arrangement provides security and prevents unauthorized tampering and potentially dangerous opening of the door when the assembly is in its operating mode.

It can also be seen in FIG. 1 that the external housing for the filtering assembly includes an upper or top panel 16 and downwardly depending side wall panels 17 which are also flat. The overall shape of the housing is that of a rectangular box-like structure. This rectangular relationship of the wall surfaces is important as will be disclosed further below. Also shown in FIG. 1 is a motor and chain drive assembly 18 of standard construction for operation of an auger screw in the base portion of the assembly. This also will be further explained below.

Figure 2:
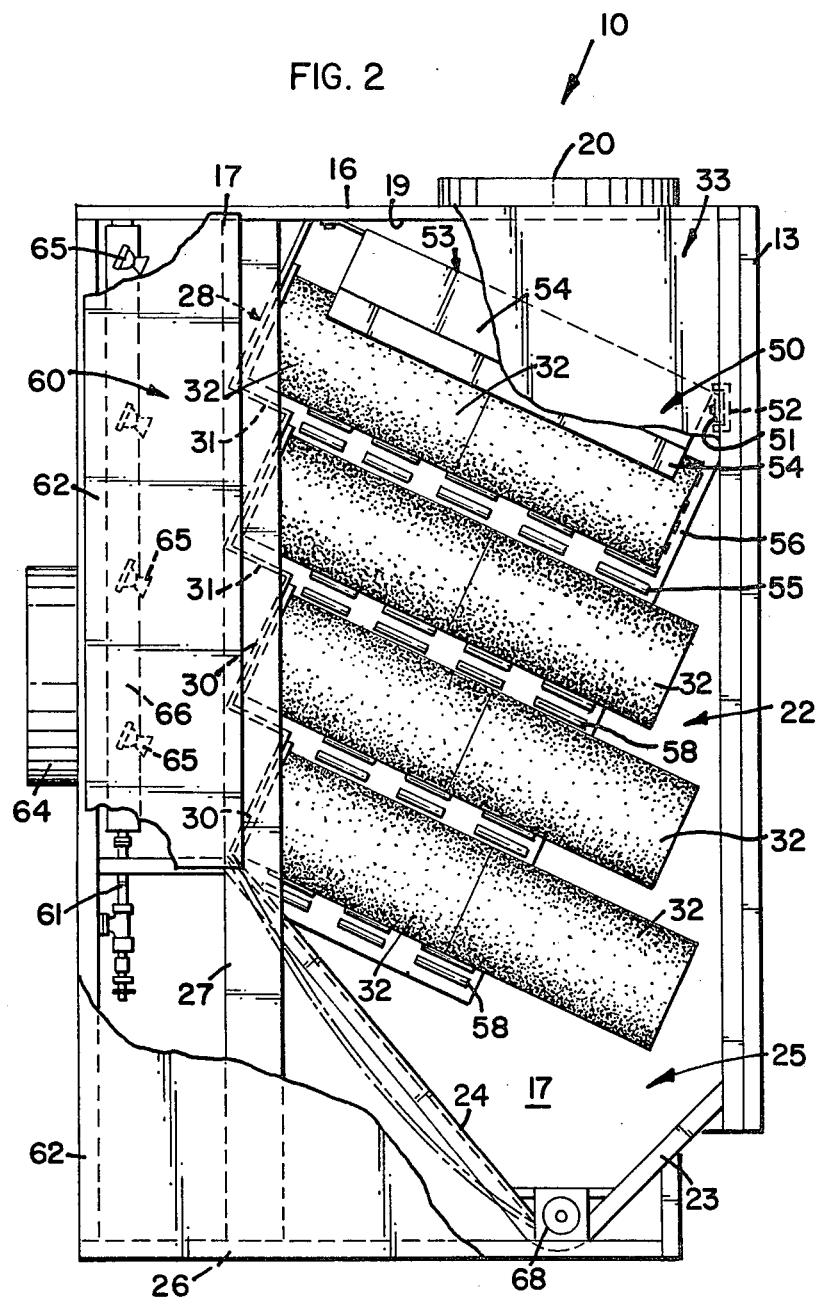
FIG. 2 is a side elevation view of the present invention with portions broken away.

Referring now to FIG. 2, the present invention is shown in side elevation with one side wall panel 17 being broken away to illustrate the arrangement of the various elements of the assembly. The upper wall panel 16 has an inner wall surface 19. In this embodiment, the air inlet is positioned in the upper wall panel so that entering dust-laden air or other contaminated fluid is introduced in a downwardly direction into the dirty air chamber 22. This allows the assembly to utilize the forces of gravity in moving the dust through the assembly 10 to the collection area. The dirty air chamber 22 is defined by the door 13, the upper wall panel 16, two pairs of opposing side wall panels 17 which extend downwardly from the upper panel, stepped wall structure 28, and a pair of sloping surfaces 23, 24. The sloping surfaces 23, 24 partially define a collection area or hopper 25 within the base portion of the assembly. A bottom base panel or frame 26 is sealed to the side wall panels 17 in any suitable, standard manner. Also, the dirty air chamber 22 is a sealed chamber in order to prevent any escape of contaminated air or fluid prior to its being filtered.

Sealed to a structural frame member 27 along each of the side wall panels 17 is mounted a tube sheet structure 28 having a step-like design to which are mounted the separate filter elements 32 of the assembly. The tube sheet structure 28 is sealed on all four sides to hermetically seal the dirty air chamber 22 from a clean air chamber 60. The structure 28 in the preferred embodiment has three steps or indented portions. Each step portion includes an upwardly extending back member 30 and a leg member 31 extending at right angles therefrom. The tube sheet structure 28 is preferably constructed from a single piece of sheet steel and thus the individual step portions are continuous extensions of the step portion immediately above it and below it. As shown in FIGS. 2 and 3, the filter elements 32 mounted to the stepped, tube sheet structure 28 are positioned in the dirty air chamber 22 in stepped or spaced apart, partially overlapping relationship, in a generally downward direction at an acute angle of inclination with respect to the horizontal plane of the upper surface panel 16. In this manner, a distribution space 33 is defined in the uppermost portion of the filter assembly 10 by the inclined baffle 50, the side wall panels 17, the upper wall panel inner surface 19, and front access door 13. As the dirty air enters the assembly 10 from the inlet 20, it is received into the distribution space 33 prior to its being filtered. The importance of the distribution space 33 and the angled suspension of the filter elements 32 within the chamber 22 will be explained in the operation of the present invention.

The individual filter elements 32 are pleated media, cylindrical tube elements. The construction of the filter media portion of each element 32 is similar to the filter element disclosed in my U.S. Pat. No. 4,171,963 which issued on Oct. 23, 1979. However, the support assembly for the hollow, cylindrical elements differs and is as shown in FIG. 4 of this application. Referring now to FIG. 4, a portion of a back member portion 30 of the tube sheet structure 28 is shown. An outlet for clean, filtered air consists of a circular opening 34 formed in the tube sheet structure. Within this opening, along the peripheral edge 35, is welded the yoke assembly 36 which supports the filter elements 32 and which places the interior of each filter element 32 in fluid communication with the clean air chamber.

The yoke assembly 36 in this embodiment has two opposing steel rods 37 each welded at its proximal end 38 to a respective portion of the outlet opening peripheral edge 35. The diameter of each rod is preferably in the range of one-half inch to three-quarters inch. The rods are of sufficient length to allow the placement of two filter elements 32 in back-to-back relationship thereon. See FIG. 2. The filter elements 32 shown in this embodiment are, for example, each about two feet in length. A rectangular shaped end plate 39 made from $\frac{3}{8}''$ cold rolled steel is welded at opposite ends to a respective portion of the distal end 40 of each rod 37. In a central portion of the end plate 39, an opening 41 for receiving the threaded end of a bolt is provided. A piece of vinyl tubing 42 is placed on the distal end portion of the top rod to act as a stop for the first filter element 32 placed on the yoke assembly 36. It serves to prevent the first filter element 32 from falling back down the rods 37 as the second element 32 is being placed on the same yoke assembly 36. Each yoke assembly is secured perpendicularly to the tube sheet structure so as to suspend the filter elements at an acute angle with respect to the horizontal. The preferred range for the angle of inclination of the filter elements is from 15°–30° from the horizontal. Each yoke assembly 36 in the invention is constructed similarly. In the embodiment shown, two parallel vertical rows of two filter elements each are provided. Each step portion of the tube sheet structure thus has two spaced apart yoke assemblies mounted to its back member 30.

FIGS. 2 and 3 taken in combination illustrate the placement of a pair of filter elements 32 onto each yoke assembly 36. An annular end cap 44 having a dish portion 45 and a centrally located opening is aligned with the end plate 39 so as to sealingly cover the outboard end of the second filter element of each pair. This allows the removable attachment of a clamping means for axially compressing the gaskets (not shown) of the filter elements 32 to seal them to the tube sheet structure 28 as well as to each other. The end cap dish portion 45 helps strengthen the end plate so that less of the cleaning pulse energy is dissipated in the metal. Also, the fastening bolt 46 with its special handle 47 is inserted through the aligned apertures of the end plate 39 and end cap 44 to secure the two together. The bolt 46 and handle 47 lie entirely within the dish portion 45 of the end cap 44 thus keeping the overall length of the filter and yoke assembly 36 to a minimum. Further, the offset handle 47 allows the bolt to be hand tightened, preventing the elements from being overtightened and possibly damaged. The handle also unbalances the bolt, thus discouraging its loosening from vibrations or pulsing.

The yoke assemblies 36 allow the pairs of filter elements 32 to be suspended from the tube sheet structure 28 in a cantileveredly downwardly inclined manner. The stepped portions provide a more rigid structure 28. None of the eight pairs of elements impose upon each other nor any other portion of the dirty air chamber 22 for support.

Means for preventing direct impingement of the entering dust laden air upon the two uppermost pairs of filter elements 32 is preferable. A baffle or shield 50 is placed apart from, but directly above each of the uppermost filter elements. The upper end of each shield 50 is secured to a portion of the inner surface 19 of the upper wall panel 16 with the opposite end 51 of the shield 50 being secured to a brace 52 mounted across the interior front from wall 17 to wall 17. See FIG. 2. The baffle 50 has a generally flat middle portion 53 and a smaller flat portion 54 extending on each side of the middle portion 53 so as to form a roof-like shield over the uppermost portion of the respective pair of filter elements 32.

A pre-separator 55 is also provided and extends downwardly between the two vertical rows of filter elements 32. In this embodiment, the pre-separator 55 consists of two louvered panels 56, 57 spaced apart so as to allow air directed by the baffles to pass down between the panels. Each panel 56, 57 is fastened to the lower edge of the respective baffle 50 directly above it. The panels 56, 57 partially reverse the direction of the air flow as the air passes through the louvered portions. Thus heavier particles drop straight down through the panel pair 56, 57, allowing cleaner air to pass through the louvers 58 and on into the filter elements 32 for final cleaning. In FIG. 2, it can be seen that the panel pair 56, 57 is narrower at its bottommost portion in order to accommodate the stepped tube sheet structure 28, causing air to travel downwardly at a relatively constant velocity.

Directly behind the tube sheet structure 28 is located the clean air chamber 60 which is defined by the back surface panel 62 of the assembly and a portion of the upper surface panel 16, a portion of the two opposing side panels 17, and the back side of the tube sheet structure 28. Mounted in the back surface panel 62 in fluid communication with the clean air chamber 60 is a clean air outlet 64 for venting the clean, filtered air into the conduit 12 for return to the plant environment. Means for cleaning each yoke assembly of filter elements is also provided in the clean air chamber 60. The means includes a plurality of pulse type valves and nozzles 65. A valve and nozzle arrangement is positioned directly in line with an outlet opening 34 in the tube sheet structure 28 so as to direct a jet of compressed air into the hollow interior of a pair of filter elements 32. This type of cleaning means is known in the art and is of standard arrangement. Each valve and nozzle arrangement 65 is operatively mounted to a compressed air manifold tank 66 which extends along and adjacent to the back panel 62. The manifold pressurizing pipe 61 is connected to an external source of compressed air (not shown).

In the bottommost portion 25 of the dirty air chamber 22 is a hopper or collection area into which the particulate matter removed by the filter assembly is ultimately collected for removal from the assembly. It is a better design to keep the volume of the hopper or collection area low so as to prevent the collection at any one time of a large volume of dust. Large volumes of dust are often the source of fire caused by spontaneous combustion. Also, with large volumes, the dust is likely to harden or cake, which will require manual removal of the dust from the assembly. As can be seen in FIG. 2, two sloping surfaces 23, 24 positioned opposite each other define a trough-like area. One of the sloping surfaces 23 is shorter in height than the other surface 24. The larger surface 24 is designed and arranged to act as a diaphragm which is movably responsive to the pressure differentials created within the dirty air chamber 22 by the operation of the pulse jet cleaning means 65, 66. The diaphragm 24 is preferably made from a flexible, reinforced rubber sheet material. However, any material sufficiently strong and flexible could be used, i.e., a relatively thin metal panel which will flex. The diaphragm movement caused by the operation of the pulse jet cleaning means will be explained in detail below.

At the intersection of the two sloping surfaces along the base panel 26 of the dirty air chamber is positioned an auger screw 68 of standard construction. The auger screw 68 as can be seen in FIG. 3 extends fully through the lowermost portion 25 or collection area of the dirty air chamber 22. It is connected externally of the assembly 10 to a standard gear-motor 18 which provides the power source for operating the auger screw 68. The particulate matter collected in the dirty air chamber 22 is removed to a location exterior to the assembly 10 by the operation of the auger screw.

OPERATION OF THE INVENTION

Air or other particulate laden gaseous fluid enters the dirty air chamber 22 through the air inlet 20. The entering air coming in at a relatively high velocity is caused to slow down when it arrives in the distribution space 33 defined by the inclined positioning of the filter elements 32 with respect to the upper surface panel 16. In this manner, better distribution of the entering air over the filter elements 32 is provided as a result of the reduced velocity. Further, the reduction in velocity significantly eliminates wear and tear caused by high speed impingement of the dust laden air streams upon the filter elements 32 in the event shields or baffles 50 are not used.

From the distribution space 33, the dirty air in the embodiment shown in the drawings is directed downwardly by the pair of baffles 50. The baffles 50 are designed to provide minimal pressure loss to the fluid or air entering the flow channels or passageways between the rows of filter elements 32. A portion of the dirty air enters a downward path of travel between the pair of louvered panels 56, 57. Other portions of the dirty air pass through openings located between the end of each baffle 50 and the front access door 13. These openings allow more dirty air to pass by the shields 50 at a lower pressure drop and such air will tend to "sweep" down the relatively smooth inside face of the front access door 13 helping to keep it clean and further providing fluid dynamic dust transport toward the collection area in the bottommost portion 25 of the assembly 10.

The air passing down between the panels 56, 57 of the pre-separator 55 is forced to partially reverse its direction in order to pass through the louvers 58 of the panels. The heavier particulate matter in the air, however, continues to drop downwardly by forces of gravity directly to the auger screw 68 in the collection area 25. The partially cleaned air which passes through the louvered panels 56, 57 as well as air entering from the opposite side of the filter arrangement is filtered by the pleated-media filter elements 32. The cleaned air exits the dirty air chamber 22 along the hollow interior of the filter elements 32 and on through a respective tube sheet opening 34 into the clean air chamber 60 where it is vented by the outlet 64 to the return air conduit 12.

It should be noted that the dirty air passageways in the present invention are relatively small in cross-section as compared to prior art devices. The dirty air passageways of the present invention allow an average dirty air velocity of between 1,000 feet per minute and 6,000 feet per minute. This provides a compactness not available in prior art devices filtering the same quantities of air.

After a predetermined interval of filtering the filter elements 32, coated now with dust and other particulate matter, must be cleaned to maintain the cleaning capacity of the invention. All of the filter elements 32 on each yoke assembly 36 are pulse-jet cleaned by its respective quick-acting valve 65 which discharges a quantity of pressurized air from the nozzle towards and into the hollow interior of the filter elements. The uppermost filter elements are cleaned first with cleaning of the remaining elements occurring from top to bottom in the assembly. Dust blown off of the upper filter elements is carried downward by gravitational settling and fluid dynamic transport from one set of filter elements onto and past the next lower set of filter elements.

During the operation of the pulse-jet cleaning means the larger, sloping surface or diaphragm 24 moves outward or away from the filter elements 32 in response to the increase in pressure within the dirty air chamber 22. This outward flexing is shown in broken lines in FIG. 2. As the pressure diminishes, the surface 24 flexes back to its normal position.

The pressure-responsive, flexing movement of the larger sloping surface 24 accomplishes four important functions: (1) the movement allows air entraining the removed dust to move downwardly towards the hopper; (2) it helps prevent the removed dust and particulate matter from being re-deposited onto adjacent elements; (3) it helps to dampen the noise and the vibrations of the pulse-jet cleaning means; and (4) it helps to move the particulate matter which has settled on the diaphragm surface towards the auger screw. As the particulate matter accumulates in the lowermost portion 25 upon the auger screw 68, it is removed, by the operation of the auger screw 68, to a location exterior to the filter assembly. There is nearly zero dirty air velocity at the point adjacent to the auger screw, as a result of the dirty air inlet not being in nor even adjacent to the particulate matter collection area of the filter assembly.

It should now be apparent from the foregoing that the advantages of the present invention include the saving of cleaning volume, floor space, materials, set-up time, shipping costs and connecting duct work, to name only a few. Additionally, there is a significant savings in maintenance labor when filter elements require replacement in that each of the filter element pairs can be changed through the single front access door. The design and arrangement of the present invention eliminates the need for a person to enter the filter housing or to climb tall ladders in order to maintain the assembly. Just as important is the reduction in the noise level of the pulse-jet cleaning means due to their placement inside the filter assembly housing and the fact that the flexible diaphragm absorbs a portion of the noise and converts the energy to do the useful work of moving the particulate matter.

In summary, the major advantages of the present invention are its compactness as a result of the use of fluid dynamics and gravity to transport the dust through the assembly, the doubling of filter elements on each yoke assembly, and the cantilever suspension and inclined positioning of the filter elements upon the yoke assemblies. The latter provides an upper distribution space for reducing the velocity of the incoming air as well as reducing the hopper or collection area volume greatly, and increases rigidity in the tube sheet structure. These and other advantages of the invention having been set forth in the foregoing description and drawings, the novel features thereof are now pointed out in the appended claims. This disclosure, however, is but illustrative and changes may be made in detail especially in matters of shape, size and arrangement of certain parts keeping with the principles of the invention, within the scope of the appended claims.

What is claimed is:

1. An air filter assembly for filtering air laden with particulate matter, said assembly comprising:
   a housing having a clean air chamber and a filtering chamber, said housing having an upper wall, a closed bottom, and a plurality of side walls depending from said upper wall;
   a clean air outlet from said clean air chamber in one of said side walls;
   a dirty air inlet to said filtering chamber positioned in a wall of said housing in a location generally above said clean air outlet;
   means separating said clean air chamber from said filtering chamber including means mounting a plurality of spaced-apart filter elements within said filtering chamber, with each of said elements being in fluid communication with said air outlet;
   pulse-jet cleaning means, intermediate said outlet and said filter elements, for cleaning each of said filter elements;
and
   a lowermost portion in said filtering chamber arranged and constructed for the collection of particulate matter, said portion having means, responsive to pressure increases in said chamber caused by said cleaning means, for moving particulate matter in a downward direction to a bottommost point in said portion for subsequent transfer to a location exterior to said assembly.

2. The assembly in accordance with claim 1 wherein said particulate matter moving means in said lowermost portion of said chamber includes at least one generally downwardly sloping surface in said portion, said surface being constructed from a flexible material which is specifically movably responsive to the increases in pressure within said chamber caused by operation of said pulse-jet cleaning means.

3. The assembly in accordance with claim 2 further including a collection area in said chamber lowermost portion for receiving particulate matter removed from said filter elements and said sloping surface, and means in said chamber lowermost portion for transferring said particulate matter from said collection area to a location exterior to said assembly.

4. An air filter assembly for filtering air laden with particulate matter, said assembly comprising:

a housing having a clean air chamber and a filtering chamber, said housing having an upper wall, a closed bottom, and a plurality of side walls extending between said upper wall and said bottom;

clean air outlet means from said clean air chamber in one of said walls;

means for separating said clean air chamber from said filtering chamber, said means including means mounting a plurality of filter elements, comprising at least two substantially parallel rows of said filter elements including uppermost filter elements, within said filtering chamber in a spaced apart relationship, each of said filter elements being in fluid communication with said clean air chamber, said mounting means positioning each of said filter elements in a generally downward, inclined direction with respect to said upper wall;

said upper wall, a portion of said side walls, and said uppermost filter elements defining an air flow distribution space in said filtering chamber above said filter elements;

a dirty air inlet in a wall defining said distribution space, whereby the velocity of the air entering said filtering chamber and passing through said distribution space is reduced;

baffle means mounted intermediate said filter elements and said air inlet for shielding said filter elements from direct impingement by said particulate laden air entering said chamber while permitting air flow downwardly over said filter elements, said baffle means including baffles positioned directly above said respective uppermost filter elements and spaced from said side walls of said filtering chamber;

cleaning means positioned between said clean air outlet means and said mounting means for periodically removing particulate matter accumulated on said filter elements; and said air inlet admitting air into said filtering chamber for distribution downwardly over and through said filter elements to filter the air and assist in transporting particulate matter downwardly toward said closed bottom of said filtering chamber.

5. An air filter assembly for filtering air laden with particulate matter, said assembly comprising:

a housing having a clean air chamber and a filtering chamber, said housing having an upper wall, a substantially closed bottom, and a plurality of side walls;

a clean air outlet from said clean air chamber in one of said side walls;

means separating said clean air chamber from said filtering chamber including means mounting a plurality of spaced apart, filter elements within said filtering chamber, said elements including an uppermost filter element, with each of said elements being in fluid communication with said air outlet, said mounting means positioning each of said filter elements in a generally downward, inclined direction with respect to said upper wall;

said upper wall, a portion of said side walls, and said uppermost filter element defining an airflow distribution space in said filtering chamber above said filter elements;

a dirty air inlet in a wall opening into said distribution space, whereby the velocity of the air entering said filtering chamber and passing through said distribution space is reduced;

pulse-jet cleaning means intermediate said outlet and said mounting means for removing particulate matter accumulated on said filter elements;

and a lowermost portion in said filtering chamber arranged and constructed for the collection of particulate matter, said portion incuding at least one sloping surface constructed from a material which is movably responsive in a flexing motion to the pressure differentials created by said cleaning means;

whereby the filtered particulate matter is caused to move downwardly for collection by the flexing of said sloping surface in response to the increases in pressure within said filtering chamber caused by the operation of said pulse-jet cleaning means.

6. The assembly in accordance with claim 5 wherein said mounting means includes a structure secured to said walls, said structure being arranged and constructed to suspend said filter elements in a spaced-apart, partially overlapping, stepped arrangement, and further including means for suspending each of said elements in a cantilever-type manner.

7. The assembly in accordance with claim 6 wherein said structure includes means for providing at least two substantially parallel rows of said suspended filter elements, each row extending from a location near said inlet to a location near said sloping surface.

8. The assembly in accordance with claim 7 further including baffle means, mounted intermediate said filter elements and said air inlet, for shielding said filter elements from direct impingement by said particulate laden air entering from said inlet, said baffle means including a baffle positioned directly above said respective filter element, spaced from said side walls of said filtering chamber, but below said air flow distribution space.

9. An air filter assembly for filtering dirty air laden with particulate matter, said assembly comprising:

a housing having a plurality of wall panels;

a sheet structure dividing said housing into a filtering chamber and a clean air chamber, said sheet structure having a plurality of openings therein;

a plurality of filter elements in said filtering chamber, comprising at least two substantially parallel rows of said filter elements, each of said filter elements being secured to said sheet structure in fluid communication with one of said respective openings in said structure;

a clean air outlet, in a wall panel of said clean air chamber, in fluid communication with each of said sheet structure openings;

means, on said sheet structure, for suspending each of said filter elements in a generally inclined position with respect to one of said wall panels so as to provide an air flow distribution space in said filtering chamber defined by said one wall panel, adjacent filter elements and a portion of the other wall panels forming said filtering chamber, said distribution space being located in a portion of said filtering chamber above said filter elements, said housing having an air inlet opening to said distribution space whereby the velocity of the air entering said filtering chamber is reduced in said distribution space;

said parallel rows of said filter elements being arranged to provide air flow channels from said distribution space along said filter elements;

pulse-jet cleaning means, positioned in said clean air chamber opposite said sheet structure openings, for periodically removing particulate matter accumulated on said filter elements;

a collection area in a lowermost portion of said filtering chamber for receiving particulate matter removed from said filter elements and carried downwardly by gravitational settling; and baffle means in said distribution space for distributing said air downwardly through said flow channels along said filter elements to thereby assist in transporting particulate matter toward said collection area, said baffle means including baffles positioned directly above said adjacent filter elements and spaced from said wall panels to shield said adjacent filter elements from direct impingement by said particulate laden air entering said distribution space.

10. The assembly in accordance with claim 9 wherein said sheet structure includes a plurality of stepped portions whereby said filter elements are arranged in a generally overlapping relationship with respect to adjacent elements.

11. The assembly in accordance with claim 10 wherein each of said stepped portions includes a generally upwardly extending back member and a leg member extending outwardly from said back member, each of said back members containing at least one of said openings therein.

12. The assembly in accordance with claim 11 wherein each of said back members contains a pair of said openings with said plurality of filter elements being arranged in two vertical rows with respect to said sheet structure, and further including means for pre-separating particulate matter from entering dust laden air before the air reaches said filter elements, said pre-separating means including a pair of spaced apart, louvered panels positioned between said rows of filter elements, said panels being constructed and arranged to partially reverse the direction of the entering dust-laden air flow whereby heavier particulate matter in separated therefrom.

13. An air filter assembly for filtering air laden with particulate matter, said assembly comprising:
 a housing having a clean air chamber and a filtering chamber, said housing having an upper wall, a closed bottom, and a plurality of side walls extending between said upper wall and said bottom;
 clean air outlet means from said clean air chamber in one of said walls;
 means for separating said clean air chamber from said filtering chamber, said means including means mounting a plurality of filter elements, including an uppermost filter element, within said filtering chamber in a spaced apart relationship, each of said elements being in fluid communication with said clean air chamber, said mounting means positioning each of said filter elements in a generally downward, inclined direction with respect to said upper wall;
 said upper wall, a portion of said side walls, and said uppermost filter element defining an air flow distribution space in said filtering chamber above said filter elements;
 a dirty air inlet opening into said distribution space and positioned in said filtering chamber at a postion generally above said outlet means, whereby the velocity of the air entering said chamber and passing through said distribution space is reduced;
 cleaning means positioned between said clean air outlet means and said mounting means for removing particulate matter accumulated on said filter elements; and
 sid mounting means including a structure secured to at least one of said side walls, said structure being constructed and arranged to position said filter elements in a spaced apart, generally overlapping, stepped arrangement and including means for suspending each of said filter elements in a cantilevered manner.

14. An air filter assembly for filtering dirty air laden with particulate matter, said assembly comprising:
 a housing having a plurality of wall panels;
 a sheet structure dividing said housing into a filtering chamber and a clean air chamber, said sheet structure having a plurality of openings therein;
 a plurality of filter elements, each of said filter elements being secured to said sheet structure in fluid communication with one of said respective openings in said structure;
 means, on said sheet structure, for suspending each of said filter elements in a generally inclined position with respect to one of said wall panels;
 a clean air outlet, in a wall panel of said clean air chamber, in fluid communication with each of said sheet structure openings;
 an air flow distribution space in said filtering chamber defined by said one wall panel, an adjacent filter element and a portion of the other wall panels forming said filtering chamber, said distribution space being located in a portion of said filtering chamber above said filter elements;
 an air inlet opening to said distribution space in one of said wall panels forming said filtering chamber, whereby the velocity of the air entering said filtering chamber is reduced in said distribution space and moved downwardly through said filter elements;
 pulse-jet cleaning means, positioned in said clean air chamber opposite said sheet structure openings, for removing particulate matter accumulated on said filter elements;
 said sheet structure including a plurality of stepped portions whereby said filter elements are arranged in a generally overlapping relationship with respect to adjacent elements; and
 each of said stepped portions including a generally upwardly extending back member and a leg member extending outwardly from said back member, each of said back members containing at least one of said openings therein.

* * * * *

REEXAMINATION CERTIFICATE (2362nd)

United States Patent [19]

Schuler

[11] B1 4,395,269

[45] Certificate Issued  Aug. 30, 1994

[54] COMPACT DUST FILTER ASSEMBLY

[75] Inventor: Frederick E. Schuler, St. Paul, Minn.

[73] Assignee: Donaldson Company, Inc., Minneapolis, Minn.

Reexamination Request:
No. 90/001,776, May 18, 1989

Reexamination Certificate for:
Patent No.: 4,395,269
Issued: Jul. 26, 1983
Appl. No.: 307,166
Filed: Sep. 30, 1981

[51] Int. Cl.$^5$ .................. B01D 46/04; B01D 46/48; B01D 50/00
[52] U.S. Cl. ........................... 55/302; 55/319; 55/324; 55/325; 55/332; 55/430; 55/484; 55/498; 55/508

[56] References Cited

U.S. PATENT DOCUMENTS

| | | |
|---|---|---|
| Re. 32,185 | 6/1986 | Copley . |
| 333,020 | 12/1885 | Morgan . |
| 582,967 | 5/1897 | Wilson . |
| 1,071,234 | 8/1913 | Howard . |
| 1,261,767 | 4/1918 | Cheney et al. . |
| 1,267,024 | 5/1918 | Wedge . |
| 1,434,090 | 10/1922 | Christensen . |
| 1,521,576 | 12/1924 | Wittemeier . |
| 1,601,148 | 9/1926 | Ruemelin . |
| 1,721,589 | 7/1929 | Donaldson . |
| 1,743,934 | 1/1930 | Ruemelin . |
| 1,807,378 | 5/1931 | Budil . |
| 1,816,064 | 7/1931 | von Waldenburg et al. . |
| 1,821,202 | 9/1931 | Birkholz . |
| 1,868,876 | 7/1932 | Boesger . |
| 1,886,548 | 11/1932 | Horne et al. . |
| 2,072,906 | 3/1937 | Rosenberger . |
| 2,202,258 | 5/1940 | Lynch . |
| 2,323,707 | 7/1943 | Danz . |
| 2,399,509 | 4/1946 | Rich . |
| 2,467,346 | 4/1949 | Trubenbach . |
| 2,553,175 | 5/1951 | Davenport et al. . |
| 2,632,527 | 3/1953 | McBride et al. . |
| 2,633,929 | 4/1953 | Farr . |
| 2,643,737 | 6/1953 | Bowers et al. . |
| 2,643,768 | 6/1953 | Eissmann . |
| 2,662,610 | 12/1953 | Heinrich . |
| 2,696,275 | 12/1954 | Pring . |
| 2,732,099 | 1/1956 | Davis ............................. 222/1 |
| 2,755,930 | 7/1956 | Eissmann . |

(List continued on next page.)

FOREIGN PATENT DOCUMENTS

| | | |
|---|---|---|
| 447061 | 3/1948 | Canada . |
| 1657124 | 1/1970 | Fed. Rep. of Germany . |
| 1563990 | 4/1969 | France . |
| 2009625 | 2/1970 | France . |

(List continued on next page.)

OTHER PUBLICATIONS

Exhibit A, Brochure from Aldridge Air Control Limited of Aldridge, West Midlands, England.
*Air and Gas Cleanup Equipment* by Pazar (1970?), p. 94

(List continued on next page.)

*Primary Examiner*—Tim R. Miles

[57] ABSTRACT

An air filter assembly (10) is disclosed which includes a dirty air chamber (22) having an air inlet (20) and a plurality of clean air outlets (34). In fluid communication with each air outlet (34) in the dirty air chamber (22) is a pleated media filter element (32) positioned so as to be suspended in a cantilever manner at an acute angle with respect to a horizontal plane. A distribution space (33) for reducing entering air velocities is created by the inclined uppermost filter elements (32) and the horizontal plane of the top surface panel (16). The lowermost portion (25) of the dirty air chamber (22) provides a collection area for particulate matter removed from the filter elements. The lowermost portion (25) includes a sloping surface (24) constructed of a material which flexes in response to pressure increases within the chamber (22). The pressure increases are generally caused by pulse-jet cleaning means (65, 66) located in a clean air chamber (60) external to but adjacent the air outlets (34) of the dirty air chamber (22).

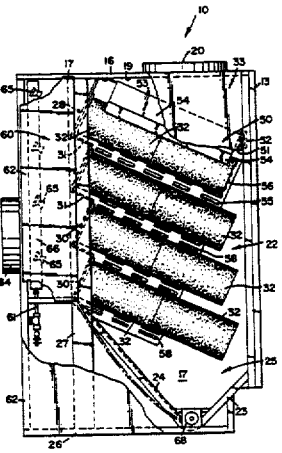

U.S. PATENT DOCUMENTS

| | | |
|---|---|---|
| 2,768,744 | 10/1956 | McGrane . |
| 2,848,061 | 8/1958 | Allander et al. . |
| 2,854,092 | 9/1958 | Gustavsson . |
| 2,867,289 | 1/1959 | Sare ................................. 55/341.1 |
| 2,904,130 | 9/1959 | Chapler, Jr. . |
| 2,963,109 | 12/1960 | Brookman et al. . |
| 2,976,130 | 3/1961 | Hedberg et al. . |
| 2,995,207 | 8/1961 | Brandt . |
| 3,061,994 | 11/1962 | Mylting . |
| 3,074,219 | 1/1963 | Phyl et al. . |
| 3,095,289 | 6/1963 | Egan . |
| 3,139,044 | 6/1964 | Cole . |
| 3,166,391 | 1/1965 | Keser . |
| 3,173,177 | 3/1965 | Tamny . |
| 3,191,630 | 6/1965 | Demyan . |
| 3,204,390 | 9/1965 | Heyl . |
| 3,246,453 | 4/1966 | Becker . |
| 3,273,317 | 9/1966 | Vicard . |
| 3,279,156 | 10/1966 | Wilhelmsson et al. . |
| 3,289,393 | 12/1966 | Spotta . |
| 3,295,298 | 1/1967 | Mackey . |
| 3,325,979 | 6/1967 | Smith . |
| 3,345,806 | 10/1967 | Bullock et al. . |
| 3,350,852 | 11/1967 | Schindling . |
| 3,377,783 | 4/1968 | Young . |
| 3,378,994 | 4/1968 | Farr . |
| 3,385,033 | 5/1968 | Basore et al. . |
| 3,395,519 | 8/1968 | Kleissler . |
| 3,396,516 | 8/1968 | Ballard . |
| 3,420,040 | 1/1969 | Neely et al. . |
| 3,421,295 | 1/1969 | Swift ................................. 55/302 |
| 3,475,884 | 11/1969 | Kulzer . |
| 3,480,330 | 11/1969 | Hirs et al. . |
| 3,491,518 | 1/1970 | Williams . |
| 3,509,698 | 5/1970 | Medcalf et al. . |
| 3,520,109 | 7/1970 | Caskey . |
| 3,545,178 | 12/1970 | Sheehan . |
| 3,614,862 | 10/1971 | Connors . |
| 3,630,005 | 12/1971 | Reinauer . |
| 3,726,066 | 4/1973 | Colley et al. . |
| 3,733,790 | 5/1973 | Pierce . |
| 3,739,557 | 6/1973 | Anderson et al. . |

(List continued on next page.)

FOREIGN PATENT DOCUMENTS

| | | |
|---|---|---|
| 2401690 | 3/1979 | France . |
| 0017590 | 10/1980 | France . |
| 7774 | 1/1975 | Japan . |
| 25100 | 8/1979 | Japan . |
| 6668 | 2/1980 | Japan . |
| 627841 | 10/1978 | U.S.S.R. . |
| 2007110 | 5/1979 | United Kingdom . |
| 2088744A | 6/1982 | United Kingdom . |

OTHER PUBLICATIONS (former distributor's [infringer's] version, numbered F000889-F0009000).

AAF "Amer Pulse" Dust Collector, Bulletin No. DC-301A.

Pactecon Model PC Pulse-Cleaned Filters, Bulletin No. 303-SLY.

Environmental Control Ltd.—Eurovent Cartridge Collector brochure.

EXIJET—Specification for Series 102 and 24 Cartridge Dust Collectors.

*Air Pollution Engineering Manual* by Danielson (May 1973?) pp. 24, 27 (infringer's version).

*Air Pollution Engineering Manual* by Danielson (May 1973) pp. 24, 27 (as in the copy in the collection of the Minneapolis Public Library).

Bulletin 233-200—Young Uni-Cage (Sep. 1967?).

Bulletin 311—R.A. Packaged Dust Collector (1972?).

Bulletin BH-10—Top Inlet Bag House Dust Collectors brochure—A.S.H. Industries, Inc.

Defendant PTS Industries' Response to Plaintiff's Fourth Set of Interrogatories to Defendant PTS Industries Pursuant to Fed.R.Civ.P. 33 with prior art attachment.

Defendant Timothy Schlentz's Response to Plaintiff's Fourth Set of Interrogatories to Defendant Timothy Schlentz Pursuant to Fed.R.Civ.P. 33 with prior art attachment.

Defendant Peter R. Schlentz's Response to Plaintiff's Fourth Set of Interrogatories to Defendant Peter R. Schlentz Pursuant to Fed.R.Civ.P. 33 with prior art attachment.

Defendant United Air Specialists' Response to Plaintiff's Fourth Set of Interrogatories to Defendant United Air Specialists Pursuant to Fed.R.Civ.P. 33 with prior art attached.

*Cartridge Type Dust Collectors* by Belanger pp. 161-166. distributor's [infringer's] version, numbered F000578-F000583).

Transport Managers Journal, "Energy Conservation" (Dec. 1980), p. 29.

"Mikro Pulsair" Collector (drawings).

*Air Pollution Handbook,* Magill (1956), pp. 13-41 thru 13-45.

*Pit and Quarry*—"Disciplining Dust" by Vedder (Oct. 1958), pp. 112-115.

(List continued on next page.)

U.S. PATENT DOCUMENTS

| | | |
|---|---|---|
| 3,816,979 | 6/1974 | Wales . |
| 3,831,354 | 8/1974 | Bakke . |
| 3,837,150 | 9/1974 | Kubiak . |
| 3,838,555 | 10/1974 | Kubiak . |
| 3,839,185 | 10/1974 | Vicard . |
| 3,847,577 | 11/1974 | Hansen . |
| 3,857,688 | 12/1974 | Wisnewski . |
| 3,883,331 | 5/1975 | Bernard et al. . |
| 3,884,657 | 5/1975 | Rebours et al. . |
| 3,926,595 | 12/1975 | Bockman . |
| 3,973,935 | 8/1976 | Moore, Jr. et al. . |
| 3,992,177 | 11/1976 | Welteroth . |
| 4,046,526 | 9/1977 | Phillippi . |
| 4,154,588 | 5/1979 | Herndon, Jr. . |
| 4,159,197 | 6/1979 | Schuler et al. . |
| 4,171,963 | 10/1979 | Schuler . |
| 4,174,204 | 11/1979 | Chase . |
| 4,187,091 | 2/1980 | Durre et al. . |
| 4,204,849 | 5/1980 | Johnston . |
| 4,214,882 | 7/1980 | Brenholt . |
| 4,218,227 | 8/1980 | Frey . |
| 4,226,723 | 10/1980 | Purchas . |
| 4,227,903 | 10/1980 | Gustavsson et al. . |
| 4,229,189 | 10/1980 | Pircon . |
| 4,247,313 | 1/1981 | Perry, Jr. et al. . |
| 4,264,345 | 4/1981 | Miller . |
| 4,277,260 | 7/1981 | Browning . |
| 4,278,454 | 7/1981 | Nemesi . |
| 4,289,510 | 9/1981 | Herndon, Jr. . |
| 4,292,053 | 9/1981 | Remillieux . |
| 4,323,377 | 4/1982 | Jolin . |
| 4,331,459 | 5/1982 | Copley .................................. 55/302 |
| 4,336,041 | 6/1982 | Jolin . |
| 4,343,632 | 8/1982 | Margraf . |
| 4,345,924 | 8/1982 | Margraf . |
| 4,359,330 | 11/1982 | Copley .................................. 55/273 |
| 4,364,751 | 12/1982 | Copley .................................... 55/96 |
| 4,390,354 | 6/1983 | Witchell . |
| 4,409,009 | 10/1983 | Lissy ..................................... 55/302 |
| 4,452,616 | 6/1984 | Gillingham et al. . |
| 4,468,240 | 8/1984 | Margraf . |
| 4,504,293 | 3/1985 | Gillingham et al. .................. 55/350 |
| 4,509,960 | 4/1985 | Engel . |
| 4,820,320 | 4/1989 | Cox . |

OTHER PUBLICATIONS

*Chemical Engineering*—"Troubleshooting Dust Collectors" by Archer (Dec. 1958) pp. 188–192.

*Chemical Engineering*—"Dry Mechanical Collectors" by Munson (Oct. 1968), pp. 147–151.

*Handbook of Fabric Filter Technology*—vol. 1—Fabric Filter System Study (Dec. 1970), pp. 1-8, 1-9, 1-16, 1-17.

*Air Pollution Engineering Manual* by Danielson (May 1973), pp. 24, 27.

*Air Pollution and Industry* by Ross (1972), pp. 350–4, 374–5.

*Air Pollution Technology* by Painter (1974), p. 197.

*Journal of the Air Pollution Control Association*—"Performance of Top and Bottom Inlet Pulse—Jet Fabric Filters" by D. Leith, et al., (1978), pp. 696–697.

*Air Pollution Manual*—Part II—Control Equipment (1968), pp. 57–58.

*Chemical Engineering*—"Dust Collection Equipment" by Sargent (Jan. 1969), pp. 130—139.

*Air and Gas Cleanup Equipment* by Pazar (1970), p. 94.

*Air and Gas Cleanup Equipment* (1972), pp. vi—ix, 223, 551-2.

*Modern Machine Shop*—"Gold Reclamation Improved with Cartridge Filters" (Feb. 1977), pp. 115–116.

*Safety Maintenance*—"Dust & Fume Control Series—Collection Equipment" (Dec. 1960), pp. 33–34.

*Air Pollution Control Equipment: Selection, Design, Operation and Maintenance* by Theodore (1982), pp. 204–205.

*Mill & Factory*—"How to Get Rid of Dust" by Vlahos (Dec. 1958), pp. 95–98.

IGCI "Operation and Maintenance of Fabric Collectors" Brochure—Publication No. F-3 (1973).

Pulsonic Bin Activator Brochure (1977).

Dustex Primary/Secondary Cyclones Brochure (Bulletin 5002).

MAC—Model "M" Dust Filter Brochure (1974).

Bulletin No. DC-1-200D—AAF—Fabric-Pulse (1971).

Technical Information Bulletin No. 138—"Monitor Air Blaster" (1979).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *